United States Patent [19]
Zapisek et al.

[11] Patent Number: 4,472,818
[45] Date of Patent: Sep. 18, 1984

[54] DATA SEPARATOR

[75] Inventors: John M. Zapisek, Hauppauge; John F. Tweedy, Jr., Bellerose Village; Gus Giulekas, West Hempstead, all of N.Y.

[73] Assignee: Standard Microsystems Corporation, Hauppauge, N.Y.

[21] Appl. No.: 577,310

[22] Filed: Feb. 6, 1984

Related U.S. Application Data

[63] Continuation of Ser. No. 327,162, Dec. 2, 1981, abandoned.

[51] Int. Cl.³ .............................................. H04L 7/02
[52] U.S. Cl. ..................................... 375/110; 375/118; 307/269; 307/511; 328/63; 328/72; 328/155; 360/51; 377/46; 377/52
[58] Field of Search ....................... 375/120, 110, 118; 307/262, 269, 511, 514, 516; 328/63, 72, 73, 139, 155, 179; 371/45, 57, 61; 370/102; 360/51; 377/46, 50, 52

[56] References Cited

U.S. PATENT DOCUMENTS

| | | | |
|---|---|---|---|
| 3,447,085 | 5/1969 | De Haas et al. | 375/120 X |
| 3,947,634 | 3/1976 | Betts | 375/120 X |
| 4,316,152 | 2/1982 | Meyer | 375/120 X |
| 4,373,204 | 2/1983 | Brooks | 375/120 |
| 4,385,395 | 5/1983 | Tanaka et al. | 375/110 |

Primary Examiner—Jin F. Ng
Attorney, Agent, or Firm—Hopgood, Calimafde, Kalil, Blaustein & Judlowe

[57] ABSTRACT

A data separator for providing data and clock information derived from a floppy disk to a controller includes a synthetic oscillator phase-locked loop which adjusts the phase of the derived clock, thereby to tend to position data inputs within the central portion of their associated half-bit slots. The center frequency of the synthetic oscillator may be modified in accordance with prior phase adjustments to compensate for variations in the speed of the floppy disk drive.

18 Claims, 16 Drawing Figures

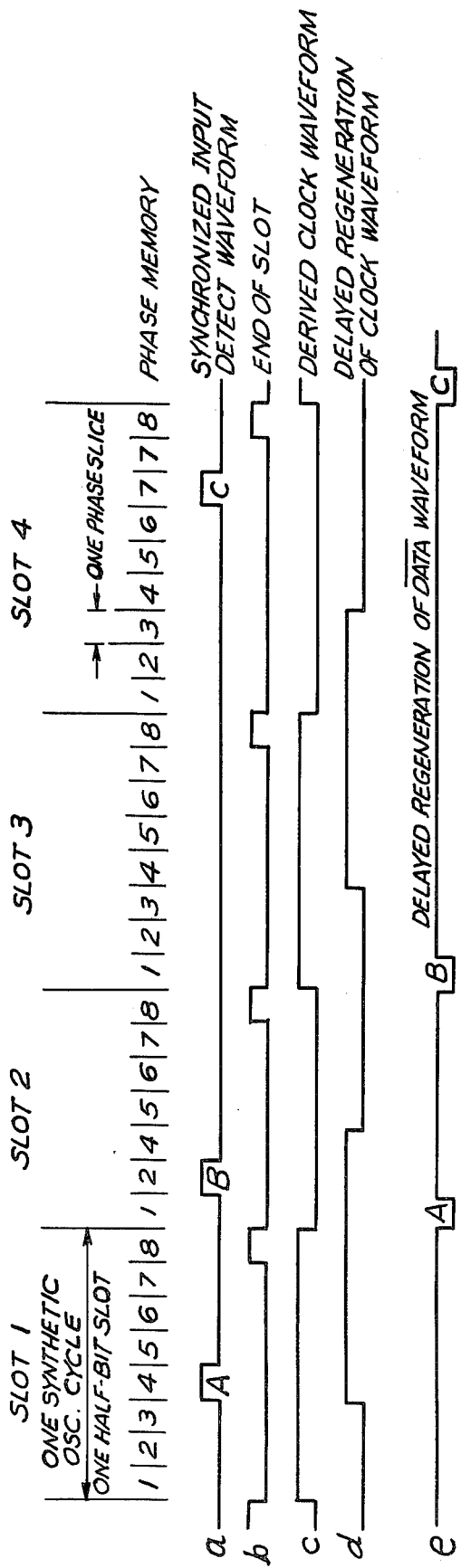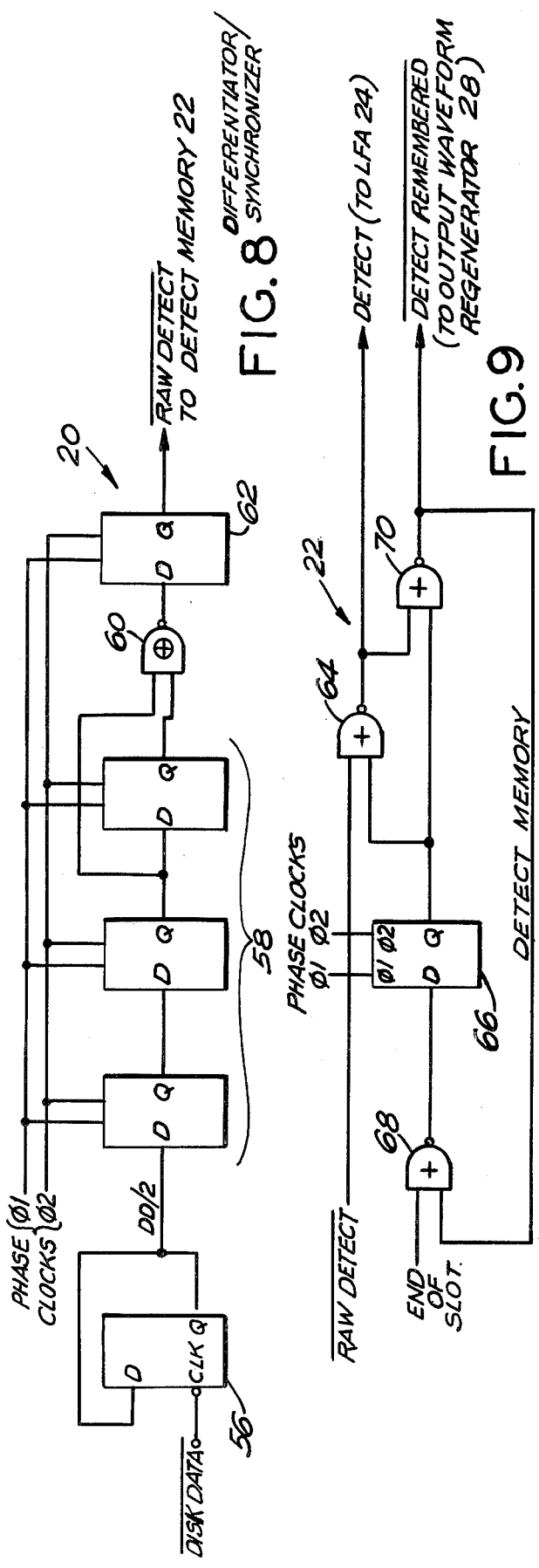

| PHASE VALUE | 1 | 2 | 3 | 4 | 5 | 6 | 7 | 8 | 1 | 2 | 3 | 4 | 5 | 6 | 7 | 8 |
|---|---|---|---|---|---|---|---|---|---|---|---|---|---|---|---|---|
| DETECT | 0 | 0 | 0 | 0 | 0 | 0 | 0 | 0 | 1 | 1 | 1 | 1 | 1 | 1 | 1 | 1 |
| NEW PHASE | 2 | 3 | 4 | 5 | 6 | 7 | 8 | 1 | 4 | 4 | 5 | 5 | 6 | 6 | 7 | 7 |
| END OF SLOT | 0 | 0 | 0 | 0 | 0 | 0 | 0 | 1 | 0 | 0 | 0 | 0 | 0 | 0 | 0 | 0 |

DATA SEPARATOR

This application is a continuation of application Ser. No. 327,162, filed Dec. 2, 1981, now abandoned.

The present invention relates generally to binary data processing, and more particularly to an improved data separator for use with a floppy disk source.

In the use of microprocessors and other types of digital processing equipment, clock and data information are conventionally applied to a controller, which acts as an interface between the data source and the computer or microprocessor. The controller also converts the binary data from the data source, such as a floppy disk, which is typically in series form, to parallel form for utilization by the computer. The output of the floppy disk is typically in the form of a combined clock-/data waveform which includes both data and clock information in alternating data and clock slots. The clock signals appears regularly at spaced intervals or clocks slots. The binary data signals are in the form of logic "1" and "0" signals, the former conventionally being defined by the presence of a pulse within a data slot, the latter conventionally being defined by the absence of a pulse signal in a data slot. The separation of the clock and data pulses is done within the controller.

In one typical arrangement, the floppy disk data is presented directly to the controller and data separator, which receives the disk data from the floppy disk and provides a derived clock to define the half-bit slots to the controller. Most conventional analog phase-locked loop data separators are connected between the floppy disk drive and the controller in this manner. In another approach, the data separator receives the disk data from the floppy disk drive and provides to the controller a regenerated data and a regenerated derived clock, which is in proper synchronism with the regenerated data. The data separator of this invention is directed to this latter arrangement.

In order for the controller to properly handle the data it receives from the data separator or directly from the floppy disk drive, the data pulses must be identified in the controller as occurring within the properly designated half-bit slot. That is, for data consisting of a logic "1" followed by three logic "0"s followed by a logic "1", the controller must be able correctly to recognize that three data slots have occurred which contained no data pulse since the occurrence of the first logic "1" and to identify the second logic "1" data pulse as falling in the half-bit slot following the three empty half-bit slots. Stated differently, the controller must be able to identify each data pulse it receives as occurring within the proper data slot; otherwise, the controller will produce an incorrect operation based on the clock-data information it receives from the floppy disk drive.

For this reason it is desirable that the data pulses, which conventionally designate a logic "1", occur as near as possible to the center of the data slot in which they occur so that the likelihood of the data being associated with the incorrect half-bit slot is reduced to essentially zero. However, as a result of magnetic effects on the floppy disk and/or variations or fluctuations in the speed of the motor that drives the floppy disk, deviations in the position of the data pulse within the slots may occur to the extent that the data pulse may occur either at the beginning or the end of a half-bit slot. Should this occur, the likelihood of the data pulse being associated in the controller with an incorrect data half-bit slot increases significantly.

Several techniques are known for deducing data pulses from clock pulses obtained from a floppy disk source. One conventional technique, as noted, involves the use of an analog phase-locked loop which employs a phase detector and a voltage-controlled oscillator to determine the data and clock slots from the serial data stream obtained from the data source. This technique presents certain disadvantages, primarily because of its need for externally adjustable components and its use of a relatively large number of components. The former factor makes it difficult to fully integrate this circuit and also contributes to the increased complexity and cost of the circuit.

Another known technique for deriving data pulses from a serial stream of data and clock pulses is the use of a monostable multivibrator to distinguish the clock pulses from the data pulses in the serial data/clock pulse stream. Although this technique produces generally satisfactory results for single-density data modes in which a clock pulse is located at every clock slot, it produces generally unsatisfactory results in higher or double-density data modes in which a clock pulse is located only in clock slots between two logic "0" data slots. This technique also requires an accurate calibration of pulse width in order to accurately derive pulses from the data stream.

It is accordingly an object of the present invention to provide an improved data separator which employs digital techniques to derive accurately defined half-bit slots.

It is a further object of the present invention to provide a data separator in which the relative phase of a derived clock to pulses in a data/clock pulse stream is sensed and corrected so that the data pulse tends to be centered within the appropriate half-bit slots.

It is another object of this invention to provide a data separator for use with a floppy disk drive which continuously and automatically senses and adjusts for variations in the frequency of data pulses caused by variations of the motor speed of the floppy disk drive.

In accordance with the invention, a derived clock pulse is produced by a synthetic oscillator phase-locked loop that includes a logic function array which implements a predetermined algorithm. The relative phase of the derived clock is adjusted or corrected in response to the sensed phase of an input data to tend to position data toward the center of its half-bit slot. The detection of an input data away from the center of the half-bit slot causes an adjustment of the phase of the synthetic oscillator such that the center of the half-bit slots defined therein is brought closer to the input pulse. In another aspect of the invention, the prior phase adjustments made to previous inputs are stored, and the center frequency of the oscillator is thereafter either increased or decreased as a function of the severity and rate of occurrence of these prior phase corrections.

To the accomplishment of the above and such further objects as may hereinafter appear, the present invention provides a data separator substantially as defined in the appended claims and as described in the following detailed specification, as considered in conjunction with the accompanying drawings in which:

FIG. 4 illustrates waveforms of signals employed in the operation of the data separator of the invention;

FIG. 8 is a schematic diagram of the differential/synchronizer of the data separator of FIG. 5;

FIG. 9 is a schematic diagram of the detect memory of the data separator of FIG. 5;

Figure 5:
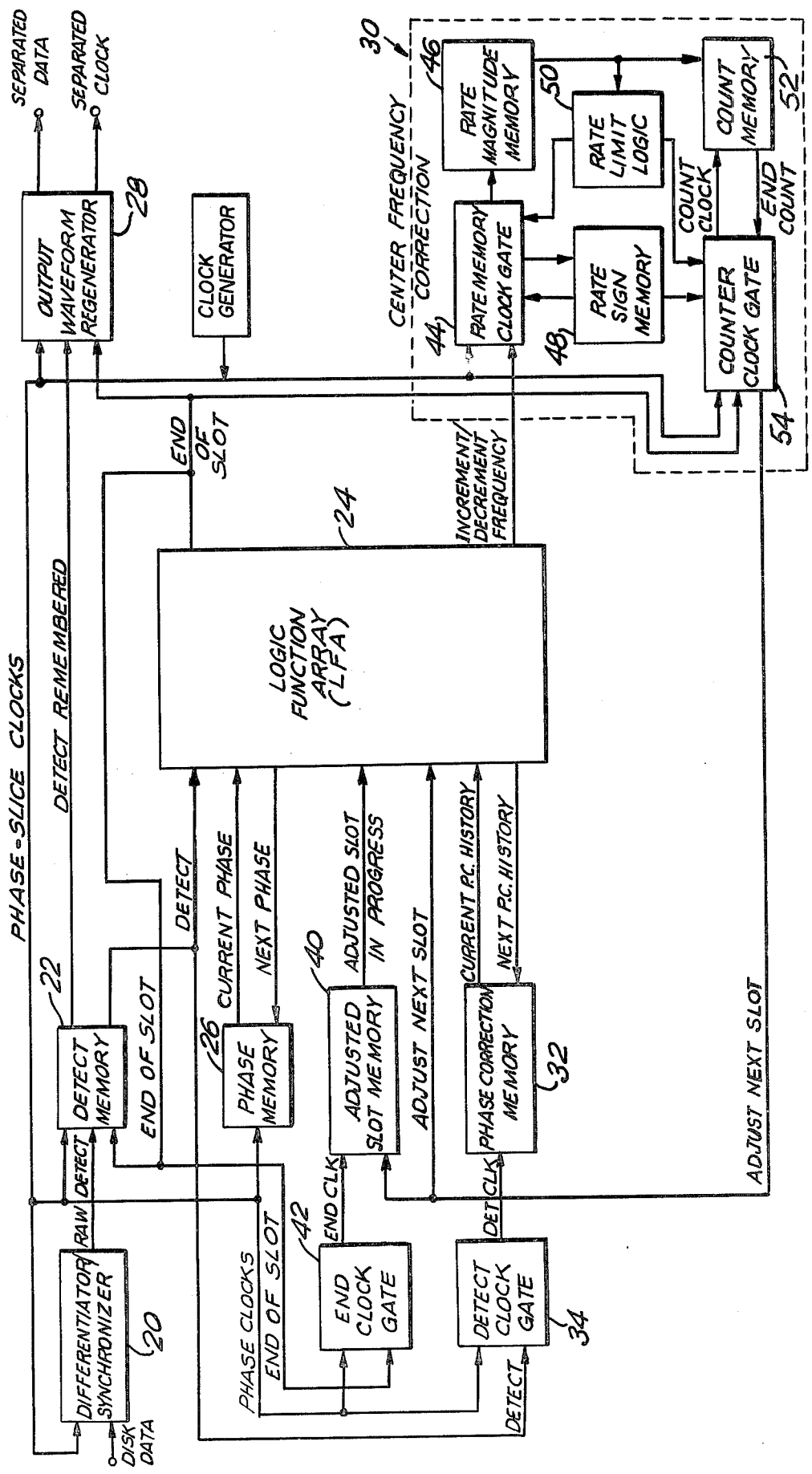
FIG. 5 is a schematic block diagram of the data separator of the invention.
Figure 14A:
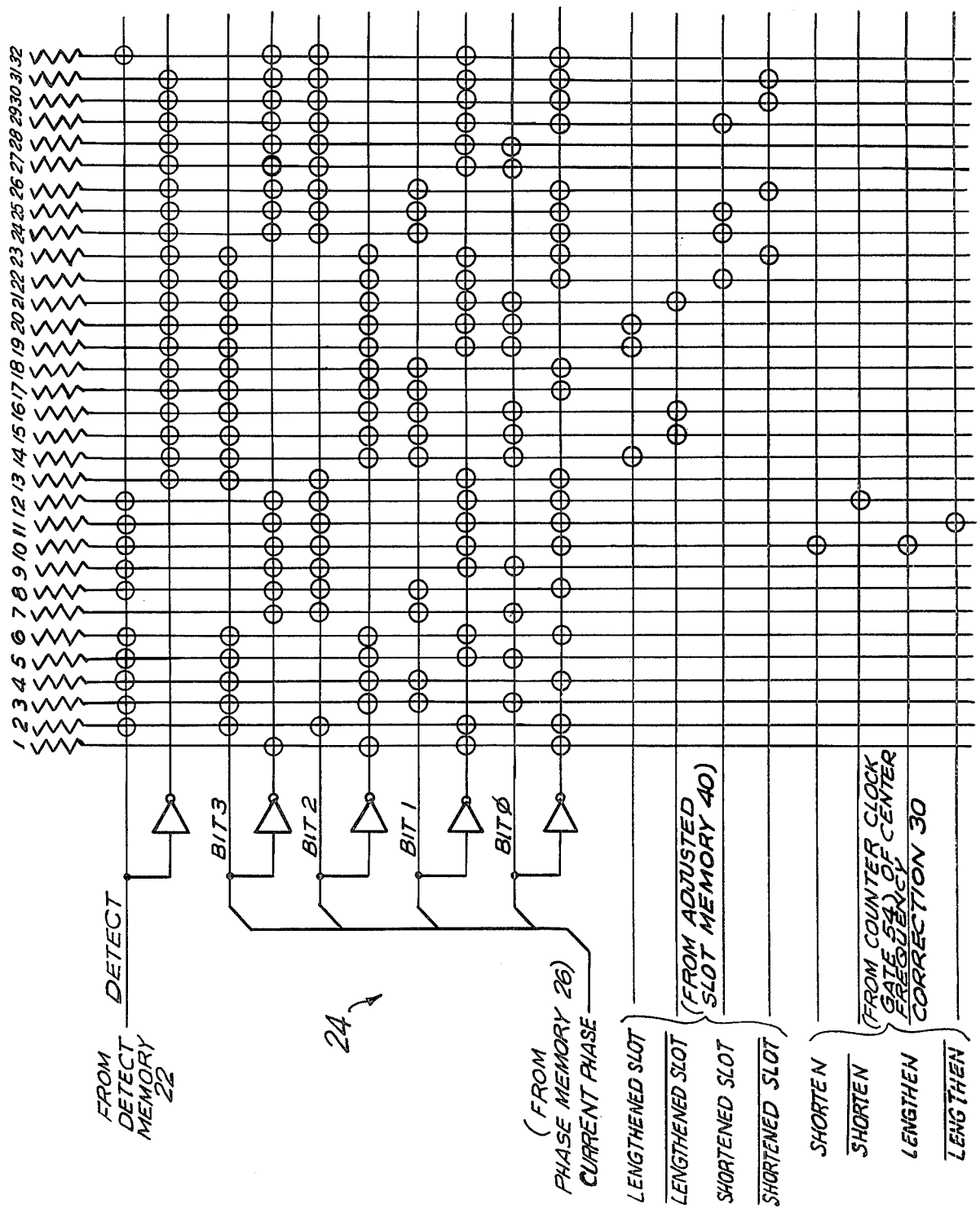
Figure 15:
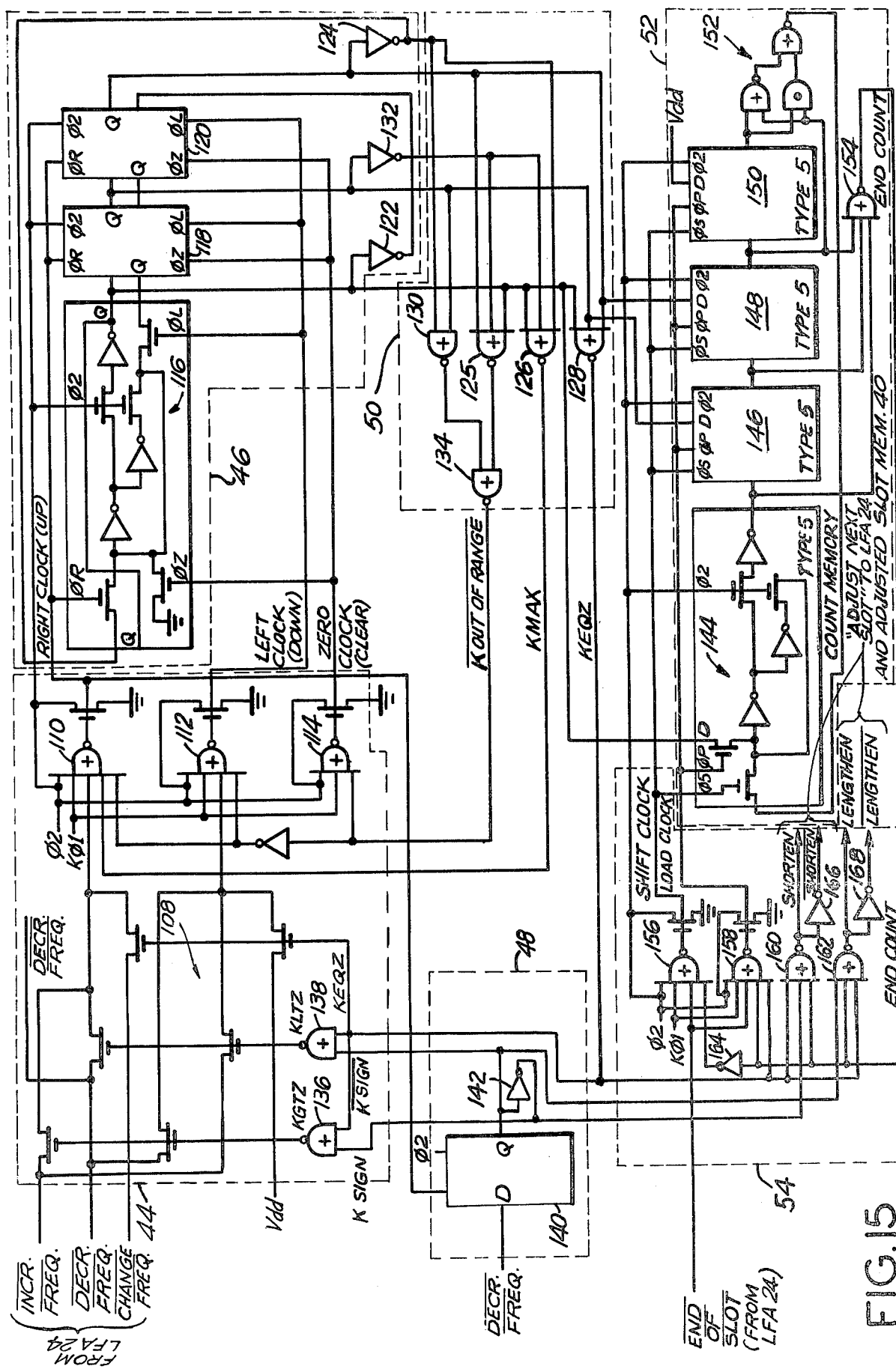

FIGS. 14A and B constitute a schematic diagram of the logic function array of the data separator of FIG. 5; and FIG. 15 is a schematic diagram of the center frequency correction of the data separator of FIG. 5.

Figure 1:
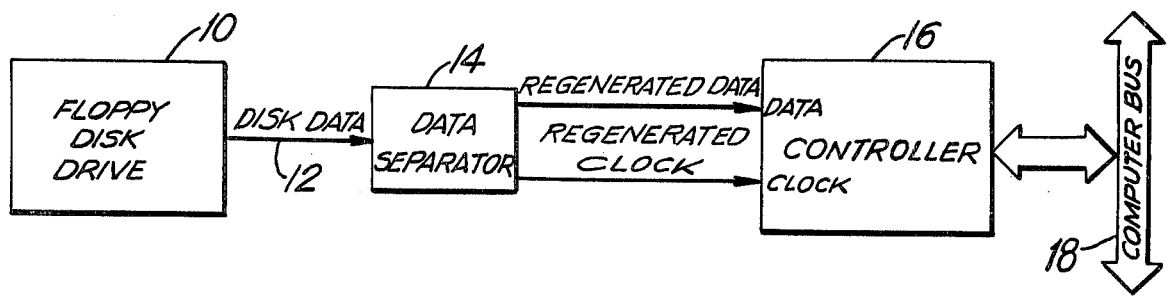
FIG. 1 is a schematic block diagram illustrating a typical application of the data separator of the invention.

Referring to FIG. 1, there is shown schematically a floppy disk drive 10 which generates disk data on a line 12. The disk data is typically a serial stream of binary data which includes both clock and data pulses in alternating clock and data half-bit slots. The data is represented by a pulse within a data slot for a logic "1" and the absence of a pulse within a slot for a logic "0".

Figure 2:
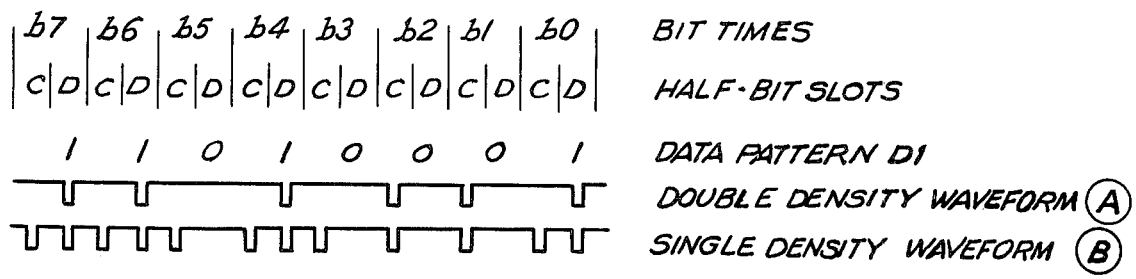
FIG. 2 is a waveform diagram of typical data and clock pulses obtained from a floppy disk source.

FIG. 2 illustrates double- and single-density waveforms for a given data pattern (hexadecimal "D1") occurring in alternating clock (C) and data (D) half-bit pulses for bit times b7 through b0. As shown in FIG. 2, in a single-density waveform a clock pulse appears at every clock half-bit slot, whereas in a double-density waveform a clock pulse appears in a clock slot only between two successive logic "0" data slots, such as occurs in the data half-bit slots during bit times b3 and b2, which causes a clock pulse to appear in the clock half-bit of bit time b2.

The data stream on line 12 is applied to the input of a data separator 14, which derives a clock signal from the combined clock/data waveform or disk data of FIG. 2, and also produces a regenerated data signal along with a regenerated clock. The synchronized regenerated clock and data are presented from the data separator output to a controller 16, in which the data slots are separated from the clock slots, and the data is coupled to a data-processing unit, such as a microprocessor, by means of a computer bus 18. Since the separation of clock and data information is performed within the controller 16, the term "data separator" as applied to unit 14 is a misnomer, but since this terminology is conventionally used in the industry it will be used throughout this specification. The present invention described below is directed to a novel data separator.

Figure 3:
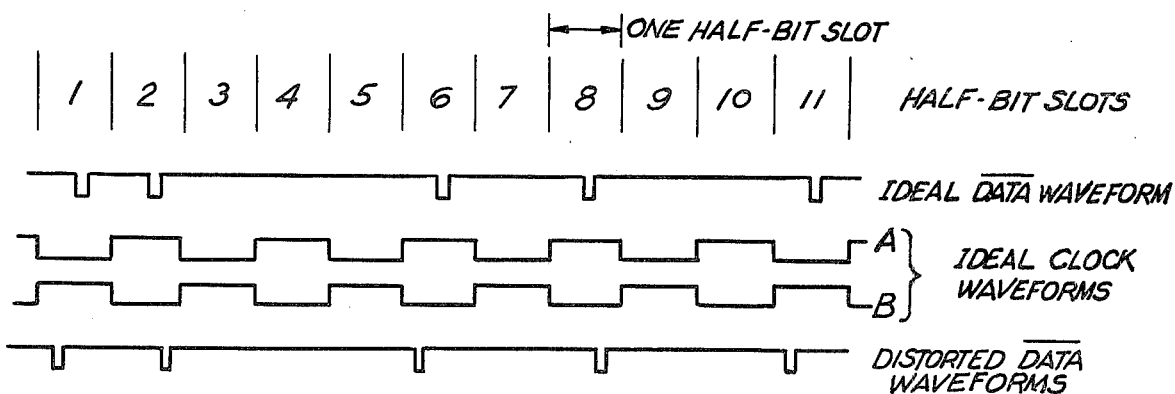
FIG. 3 shows data and clock waveforms illustrating the relationship of the clock waveform to the half-bit slots required by typical floppy disk controllers.

The relationship of the clock waveform to the half-bit slots required by several currently available floppy disk controllers is shown in FIG. 3. In this waveform the end of one half-bit slot and the beginning of the next slot is defined by a transition of the clock waveform. Both positive-going and negative-going transistions are handled in the same manner in the controller, and the fact that the clock waveform is high during one half-bit slot and low during the next half-bit slot is of no importance in differentiating clock slots from data slots. Thus, clock waveforms A and B in FIG. 3 are functionally identical.

The position of a data pulse in the data waveform is taken to be its leading edge. Thus, as shown in the ideal data waveform of FIG. 3, the leading edge of each data pulse should be centered in its half-bit slot, midway between clock waveform transitions. If a data pulse is widened so that the clock waveform transitions during the pulse, the pulse is associated with the half-bit slot containing the leading edge of the pulse.

However, in actual systems in which data and clock signals are derived from a floppy disk, an ideal data waveform is not presented to the data separator. Rather, as a result of magnetic effects on the floppy disk and variations in the disk speed, the pulse positions are caused to vary from the desired center of their associated half-bit slots, so that data pulses may occur early or late within their half-bit slots, as exemplified by the data pulses occuring in the half-bit slots 2 and 6 shown in the lowermost waveform of FIG. 3. The derived clock should delineate the half-bit slots as accurately as possible so that the position of a pulse may vary with the greatest margin and still be associated with the correct half-bit slot. In accordance with the present invention, as described in greater detail below, this is accomplished by adjusting the phase of the derived clock so that the average positions of the data pulses tend to be centered in the associated half-bit slots.

To this end, the data separator of the invention includes a synthetic oscillator phase-locked loop, one cycle of which corresponds to one half-bit slot. As shown in FIG. 4 each oscillator cycle consists nominally of eight phase slices, which are also designated in FIG. 4 as phase memory values 1 through 8. In the data separator of the invention, the detection of an input pulse away from the center of its half-bit slot (that is, in other than phase slices 4 or 5) causes a phase correction to be applied to the synthetic oscillator, bringing the center of the half-bit slot closer to the data pulse. Referring to FIG. 4(a), input pulse A in slot 1 is centered, that is, it occurs within phase slice 4, so that no correction will be applied to this pulse. Input pulse B appears early in half-bit slot 2, that is, it occurs in phase slice 2. The off-center position of the input pulse is detected and the half-bit slot is "shortened" so that the input pulse is effectively shifted toward the center of the half-bit slot. Slot 3 contains no input pulse and is not corrected. The input pulse C in slot 4 is late within that slot, that is, it occurs in phase slice 7; in this case the slot is "lengthened", thereby again to tend to bring the input pulse toward the center of its associated half-bit slot 4.

In the absence of an input pulse detection, the synthetic oscillator phase-locked loop logic periodically produces an end-of-slot signal (FIG. 4(b)) every eight phase slices or at the end of each slot. This signal defines the derived clock waveform and the duration of each half-bit slot. The occurrence of an input detection during a half-bit slot is remembered and is used to regenerate the data waveform pulses immediately following the end-of-slot signal. The relationship between the detected and regenerated pulses A, B, and C is shown in FIGS. 4(a) and 4(e). A delayed form of an end-of-slot is used to toggle the regenerated clock (FIG. 4(d) so that the regenerated data pulses are more nearly centered with respect to the regenerated clock, as desired, for greater compatability with existing controllers.

The length of the slots may be adjusted; that is, either increased or decreased, thereby to modify the effective frequency of the synthetic oscillator, in accordance with the sensed previous adjustments made to the relative phase of the detected data pulse to maintain the desired relation between the data and derived clock.

An embodiment of a data separator, including a synthetic oscillator phase-locked loop which carries out these operations is illustrated schematically in FIG. 5. As therein shown, an inverted disk data signal is applied to an input of a differentiator/synchronizer 20 described in greater detail below with reference to FIG. 8. Differentiator/synchronizer 20 also receives phase slice clocks $\phi_1$ and $\phi_2$, the frequency of which, in this embodiment, is eight times that of the half-bit slot frequency, since each half-bit slot nominally is to include eight slices.

The differentiator/synchronizer 20 produces an inverse raw detect output upon the detection of a disk data signal that is synchronous with the pulse slice clock, and thus can be accurately defined as falling within one of the eight phase slices which make up one half-bit slot; that is, the raw detect signal produced by differentiator/synchronizer 20 for any disk data pulse is present in one and only one phase slice.

The inverse raw detect output of differentiator/synchronizer 20 is applied to one input of a detect memory 22, which also receives the phase slice clocks and an end-of-slot signal from a logic function array (LFA) 24, as described later in this application. Detect memory 22, which prevents more than one detect signal produced by differentiator/synchronizer 20 from being recognized during any one slot, produces a detect signal, which is applied to the synthetic oscillator logic function array 24. The latter, along with a phase memory 26, which supplies current phase data to the LFA, constitutes a phase-locked loop or synthetic oscillator.

Figure 10:
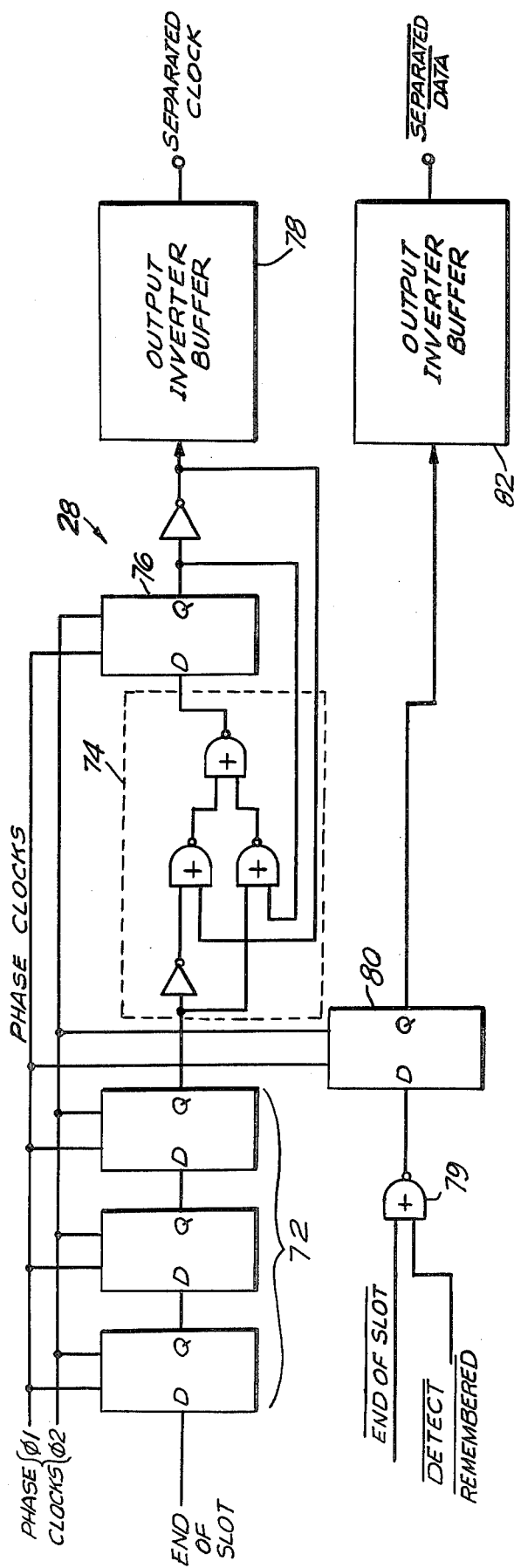
FIG. 10 is a schematic block diagram of the output waveform generator of the data separator of FIG. 5.

As described in greater detail below with respect to FIGS. 6 and 7, logic function away 24 implements a predetermined algorithm to adjust the phase value of the detected input data with respect to the end-of-slot signal so that data pulses tend to be centered within their associated half-bit slots. The end-of-cycle signal produced by LFA 24 is applied to one input of an output waveform regenerator 28, which also receives an inverted detect remembered signal from detect memory 22. Output waveform regenerator 28, which is described in greater detail below with respect to FIG. 10, upon the receipt of the next end-of-slot signal, produces a delayed regenerated clock waveform (FIG. 4(d)) and a regenerated data waveform or output data pulse, (FIG. 4(e)), which is time-synchronized but delayed with respect to the end-of-slot signal.

As noted the LFA 24 receives a current phase signal from phase memory 26 and, in turn, supplies the phase memory with a next phase signal, which is determined in LFA 24 in accordance with the algorithm that the LFA is designed to implement. The phase memory 26 stores the current phase data and supplies the current phase signal to the LFA in synchronism with the phase slice clocks.

Figures 6, 7:
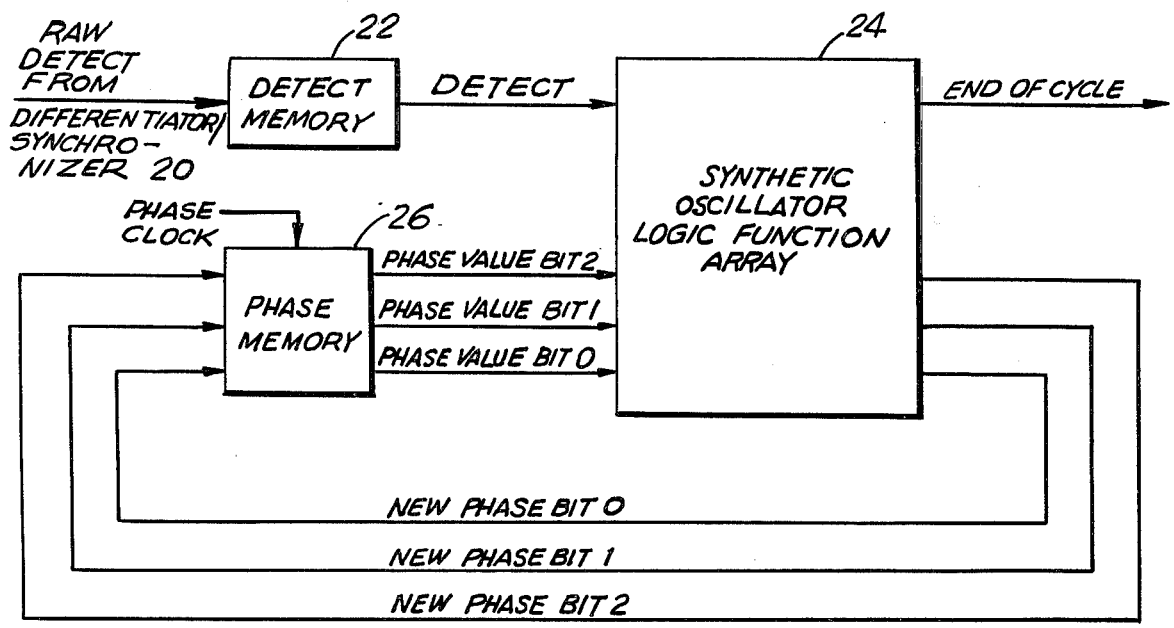
FIG. 6 is a more detailed schematic block diagram of the synthetic oscillator phase-locked loop of the data separator.
FIG. 7 is a typical algorithm that may be implemented in the synthetic oscillator phase-locked loop of FIG. 6.
Figure 14B:
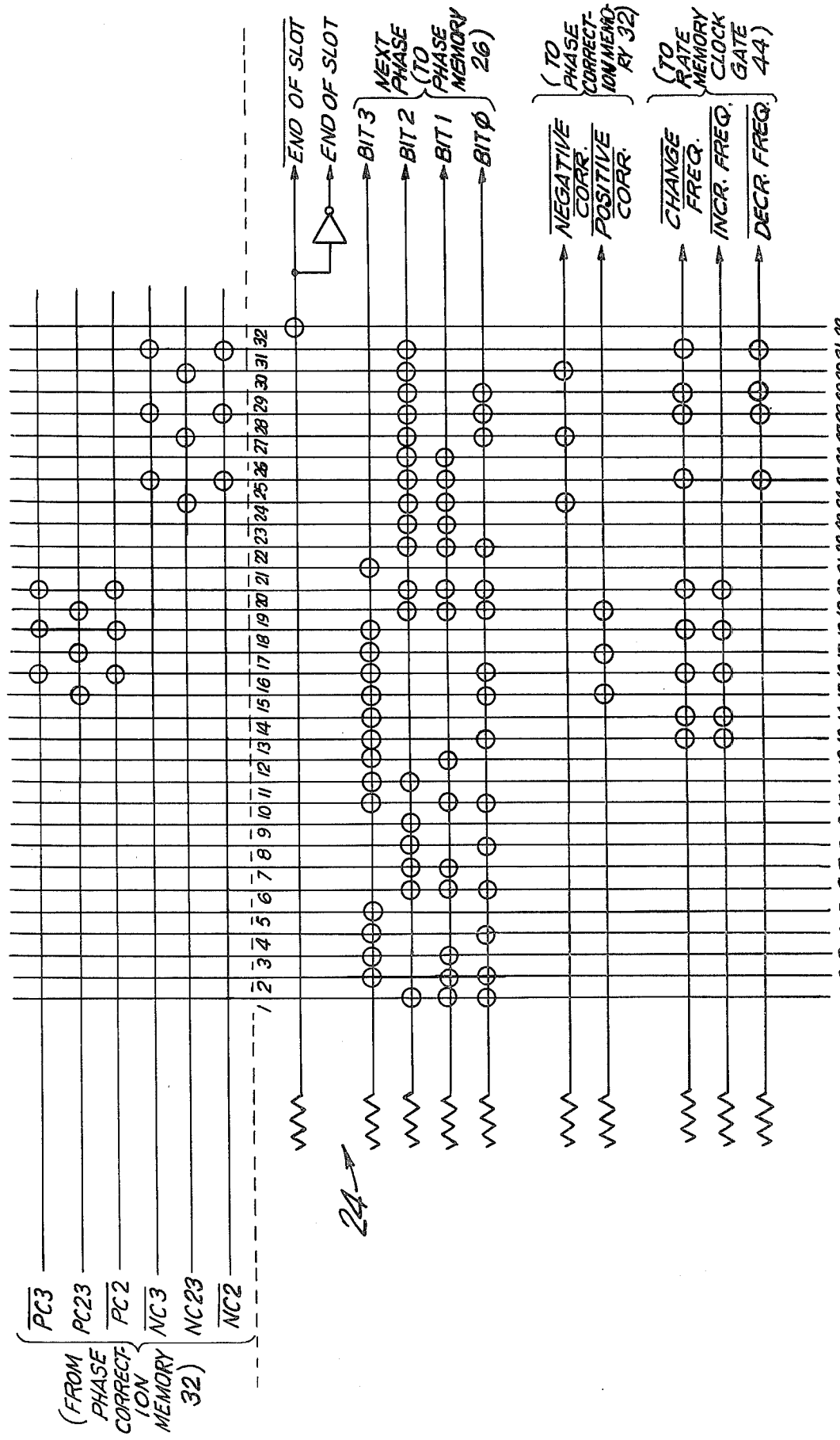

The LFA 24, as shown in greater detail in FIG. 14, is designed to implement a synthetic oscillator phase-locked loop algorithm such as the one shown for illustrative purposes in FIG. 7. In addition to the logic for implementing this algorithm illustrated in the embodiment of the LFA shown in FIG. 14, several logic circuits capable of implementing the algorithm, which are known to those skilled in the art, may also be used. Thus, LFA 24 may, in addition to the logic circuit of the type shown in FIG. 14, also be constituted by a programmable logic array (PLA), a read-only memory (ROM), a look-up table, or random logic. The LFA may also consist of several logic gates connected in a known manner to implement the desired algorithm.

Looking at the truth table of the algorithm of FIG. 7, it can be seen that the absence of a detect pulse from detect memory 22, that is, when detect is "0", will cause LFA 24 to implement and apply to phase memory 26 a next phase signal, made up in the illustrative implementation or embodiment shown in FIG. 6, of new phase bits 0, 1, and 2, which is one phase higher than the phase value made up of the current phase value bits 0, 1, and 2 that LFA 24 receives from phase memory 26. Thus, as seen in the truth table, for a phase value of 2 in the absence of a detect, the new phase will be 3. Likewise for a phase value of 4, with the detect signal, the new phase will be 5, and so on. As seen in FIG. 7, no end-of-slot signal is produced in LFA 24 except during a phase value of 8 and in the absence of a detect signal. That is, in the absence of a detected data signal, the LFA will produce an end-of-slot signal every eight phase slices when it receives a current phase value signal of phase 8. At the same time, LFA 24 produces a new phase 1, which is applied to the phase memory 26 to cause the cycle to repeat. In this way, the LFA algorithm implements a synthetic oscillator by producing, in the absence of a detected data input, an end-of-slot signal once every half-bit slot.

When LFA 24 receives a detect signal corresponding to a detected data input to differentiator/synchronizer 20, it will, as shown in the right-hand portion of the algorithm of FIG. 7, implement a different new phase in accordance with the current phase at which the input edge appears. Thus, for example, if the detect signal appears at phase 1, which is toward the beginning of the slot, the LFA implements a new phase of phase 4, rather than phase 2, which would normally occur in the absence of an early detect signal. This is considered as a two-slice or two-phase correction or adjustment.

Since the detect signal is no longer present in the subsequent phase slice, the LFA will then implement the left-hand side of the algorithm of FIG. 7 and produce a new phase 5 in response to the receipt of a current phase 4, in effect eliminating phases 2 and 3 and causing the end-of-slot signal to appear two slices earlier than would occur in the absence of the detect input at phase 1. This operation tends to center the data within the slot by adjusting the phase of the derived clock by two slices or, stated differently, by shortening the derived slot by two slices. If a detect signal occurs at either phase 2 or phase 3, the LFA will produce a new phase 4 or 5, respectively, thereby causing the end-of-slot signal to occur on slice earlier than it would have in the absence of the detect signal at the early part of the slot.

If the detect signal should occur at phases 4 or 5, which corresponds to the center of a half-bit slot, the LFA will produce new phases 5 and 6, the same phase values it would produce if there were no detect signal. In this case, the end-of-slot signal is produced at its normal time, so that no correction or adjustment is made to the end-of-slot or to the derived clock since the data is already properly centered within its proper half-bit slot.

If the detect signal appears in slot 6 or 7, that is, toward the end of a slot, the LFA implements a delay in the end-of-slot signal by producing a new phase which is the same as the current phase, that is, phase 6 or 7 respectively, thereby causing a delay of one slice in the end-of-slot signal, which, as before, tends to center the detect signal from the end of the slot to the center of the slot as desired, this time by effectively "lengthening" the slot by one slice.

Finally, if the detect signal occurs at phase 8, that is, at the end of a slot, the algorithm implemented in LFA 24 causes the new phase to be phase 7, which is one phase less than the input phase. This will cause a two-slice delay in the occurrence of the end-of-slot signal and of the derived clock. The LFA thus makes a two-slice correction for data detected in the end of a slot, as it does to a detect signal at the beginning of a slot. Thus, in summary, a one-slice or "moderate" correction is made when a detect signal occurs in phase slices 2, 3, 6, or 7; a "severe" or two-slice correction is made when a detect signal occurs in either phase slice 1 or phase slice 8; and no correction is made when a detect signal occurs in phase slices 4 or 5.

This algorithm implemented by the LFA can be represented by the following table:

| Current phase value: | 1 | 2 | 3 | 4 | 5 | 6 | 7 | 8 |
|---|---|---|---|---|---|---|---|---|
| New phase value (no input detected): | 2 | 3 | 4 | 5 | 6 | 7 | 8 | 1 |
| Phase correction upon input detection: | +2 | +1 | +1 | 0 | 0 | −1 | −1 | −2 |
| New phase value (input pulse detected): | 4 | 4 | 5 | 5 | 6 | 6 | 7 | 7 |

The variation in the rotational speed of many floppy disk drives is as much as two percent. If data is recorded on a drive that is running two percent slow and retrieved on a drive running two percent fast, the disk data waveform presented to the data separator will be going four percent faster than nominal. Similarly, the data separator may be required to handle disk data going as much as four percent slow. To compensate for these variations in average half-bit frequency, in an additional aspect of the invention, a center-frequency correction is provided to the synthetic oscillator.

To this end, a brief history is kept of input pulse detections which have caused phase corrections in the manner described above to center the data within the associated time slots. This history is used to cause subsequent phase corrections to produce upward or downward increments in the effective center frequency of the synthetic oscillator by making corresponding periodic adjustments to the slot lengths.

The phase corrections caused by the detection of data inputs away from the center of the half-bit slots as described above are classified into five types: severe positive (+2 slices), moderate positive (+1 slice), insignificant (0), moderate negative (−1 slice), and severe negative (−2 slices). In accordance with the frequency correction algorithm implemented in LFA 24, three consecutive input pulse detections which result in moderate positive phase corrections will cause an increment frequency request to be sent to a center frequency correction 30 upon the third such detection, and a single severe positive phase correction will also cause an increment frequency request to be made by the LFA. Similarly, three consecutive moderate negative phase corrections or one severe negative phase correction will cause a decrement frequency request to be applied to center frequency correction 30.

A phase correction memory 32 receives and stores phase correction history from LFA 24 in the form of a signal indicating the recent prior phase corrections made by the LFA. The phase correction memory 32 also receives a detect clock signal from a detect clock gate 34, which receives the detect signal from detect memory 22, and which gates the detect signal with the phase clocks to generate the detect clock. Phase correction memory 32 provides LFA 24 with a current phase correction (P.C.) history signal representing the phase corrections previously implemented by the LFA. Based on these prior phase corrections, an increment or decrement frequency signal may be produced by LFA 24, which, as noted, is applied to center frequency correction 30; the latter also receives the end-of-slot signal.

In brief, as described in greater detail below, center frequency correction or linearly incrementable rate generator 30 counts the occurrences of end-of-slot signal received from the LFA 24, and when a phase correction has been implemented in LFA 24 to cause the latter to generate a frequency increment or decrement signal, center frequency correction 30 provides an adjust next slot signal once for each three, four, six, or twelve half-bit slots depending on the number of frequency change signals that have been stored in rate memories 46 and 48 contained within the center frequency correction 30. If that rate memory value is zero, no adjust next slot signal will be asserted by center frequency correction 30. The adjust next slot signal, whenever it is asserted by the center frequency correction, modifies the length of the next half-bit slot by adding a slice to or removing a slice from the beginning of the next slot depending on whether the synthetic oscillator frequency is to be increased or decreased to correct or compensate for the previously sensed variations in the average half-bit frequency.

The adjust next slot signal produced by the center frequency correction is also applied to an adjusted slot memory 40, which also receives a clock from an end clock gate 42, which occurs upon the gating of a phase clock by an end-of-slot signal in end clock gate 42. Adjusted slot memory 40 provides an adjusted slot in progress signal to LFA 24 once each slot asserting that an adjusted slot is in progress, and instructs the LFA to modify the phase adjust algorithm in correspondence to the adjustment of the slot in progress.

As described in greater detail below, in the embodiment of the invention herein described, the rate memory value of the center frequency correction can assume one of five possible absolute values: 4, 3, 2, 1, or 0. Depending on the direction, to wit, up or down, of a previous phase correction, a rate sign memory in center frequency correction 30 asserts either a positive or negative rate sign for the stored rate memory value; a positive rate sign produces "a shorten next slot" signal and a negative rate sign produces "a lengthen next slot"

signal. As noted, if the rate memory value is zero, no slot adjustment signal is asserted. The adjust next slot signal is asserted every 12/n slots where n is the absolute stored rate memory value. Thus, for a stored rate memory value of 1, 2, 3, or 4 reflecting both the number and severity of previous phase corrections, slot adjustment (lengthen or shorten next slot) signal are respectively asserted once every 12, 6, 4, or 3 slots, causing a corresponding change in the period of those slots and thus in the "frequency" of the synthetic oscillator.

For example, the assertion of a "shorten next slot" by center frequency correction 30 causes the phase memory 26 to be preset to 2, rather than to 1, following an end-of-slot, and the assertion of "lengthen next slot" causes the phase memory 26 to be preset to 0 following an end-of-slot. Since each half-bit slot contains nominally eight phase slices, a one-phase slice adjustment to the slots produced in this manner every 12, 6, 4, or 3 slots causes a fractional correction to the average half-bit slot frequency of $(\frac{1}{8})/12$, $(\frac{1}{8})/6$, $(\frac{1}{8})/4$, or $(\frac{1}{8})/3$ for rate memory values of 1, 2, 3, or 4, respectively, or approximately 1, 2, 3, or 4 percent, respectively.

The adjusted slot memory 40 indicates to LFA 24 whether a shortened, nominal, or lengthened slot is in progress. The phase correction and frequency correction algorithm are modified accordingly. If no input pulse is detected, then no phase correction is performed, and the new phase value is one more than the current phase value, except at end-of-slot, as shown in the following:

| Current phase value: | 0 | 1 | 2 | 3 | 4 | 5 | 6 | 7 | 8 |
|---|---|---|---|---|---|---|---|---|---|
| New phase value: | 1 | 2 | 3 | 4 | 5 | 6 | 7 | 8 | 0, 1, or 2 |

As shown, the phase value taken following an end-of-slot at phase 8 can be 0, 1, or 2, depending on the slot adjustment being requested by the center frequency correction. If an input pulse is detected, on of the following phase corrections is performed depending on whether a shortened, nominal, or lengthened slot is in progress:

| Current phase value: | 0 | 1 | 2 | 3 | 4 | 5 | 6 | 7 | 8 |
|---|---|---|---|---|---|---|---|---|---|
| Shortened-slot phase correction: |  | +1 | +1 | +1 | 0 | −1 | −1 | −1 |  |
| Nominal-slot phase correction: |  | +2 | +1 | +1 | 0 | 0 | −1 | −1 | −2 |
| Lengthened-slot phase correction: | +2 | +1 | +1 | 0 | 0 | 0 | −1 | −1 | −2 |

The classification of phase corrections as severe, moderate, or insignificant also depends upon whether a shortened, nominal, or lengthened slot is in progress. In the table below, 'S+' indicates a severe positive correction, 'M+' indicates moderate positive, 'I' indicates an insignificant or no correction, 'M−' indicates moderate negative, and 'S−' indicates a severe negative correction. Phase corrections can only occur when an input pulse is detected.

| Current phase value: | 0 | 1 | 2 | 3 | 4 | 5 | 6 | 7 | 8 |
|---|---|---|---|---|---|---|---|---|---|
| Shortened-slot correction: |  | M+ | M+ | I | I | I | M− | M− |  |
| Nominal-slot correction: |  | S+ | M+ | M+ | I | I | M− | M− | S− |
| Lengthened-slot correction: | S+ | M+ | M+ | I | I | I | M− | M− | S− |

Center frequency correction 30, which is illustrated in greater detail in FIG. 15, further includes a rate memory clock gate 44, which receives the increment, decrement, and change frequency signals from the LFA, rate limit signals from rate limit logic 50, and rate sign signals from rate sign memory 48, along with the phase slice clocks, and gates these signals to increment, decrement, or clear the rate memory value count stored in a rate magnitude memory 46, and to update the rate sign value stored in a rate sign memory 48.

The gated frequency increment or decrement signal from rate memory clock gate 44 is applied to rate magnitude memory 46 either as a right clock (up) or a left clock (down) shift signal, thereby to raise of lower the count stored in memory 46. When rate limit logic 50 provides a signal to rate memory clock gate 44 asserting that the count in rate magnitude memory 46 is zero, the next rate control input, whether it be a decrement or increment signal, will produce a right or up shift in memory 46, causing the count n in the rate magnitude memory to change from a 0 to a 1. Rate sign memory 48 will, on the receipt of the next rate control signal either to increase or decrease the count in memory 46, assert either a $\overline{KSIGN}$ or KSIGN signal depending respectively on whether a frequency increment or decrement signal is then received from the LFA.

As noted, in the embodiment of the invention herein described, a maximum value of 4 is imposed on the rate memory value count to be stored in rate magnitude memory 46, which, as shown in FIG. 15, includes a three-stage left-shift/right-shift register. The count stored in the three stages of rate magnitude memory 46 is applied to rate limit logic 50, which produce a maximum value signal (KMAX) when the count in memory 46 is at its maximum count of 4, a KEQZ signal when the count in memory 46 is zero, and an out of range signal (K out of range) when, as may occur at startup, the bits stored in the three stages of memory 46 do not constitute one of the five values of 0, 1, 2, 3, and 4 that may be properly stored in the memory.

The limit signals from rate limit logic 50, when asserted, are applied to the rate memory clock gate 44. The assertion of an out of range signal causes the rate memory clock gate 44 to generate a zero clock or clear signal to the rate magnitude memory 46 to clear the rate memory to zero, irrespective of whether a frequency increment or decrement signal is being asserted. The presence of a KMAX signal prevents the next frequency increment or decrement signal applied to rate memory clock gate from increasing the count stored in rate magnitude memory 46.

The count stored in the rate magnitude memory 46 is periodically applied to a four-stage presettable random-walk count memory 52 whenever the latter receives a load clock signal from a counter clock gate 54. Counter clock gate 54 at other times provides a shift clock to count memory 52 once each slot as described below. Counter clock gate 54 also receives the end-of-slot signal from LFA 24 and the phase slice clocks, as well as the rate sign, to wit, a KSIGN or $\overline{\text{KSIGN}}$ signal from sign rate memory 48. Counter clock gate 54 provides to the LFA the adjust next slot signals at a rate determined by the count n stored in rate magnitude memory 46 in the manner now explained.

As noted, the count n stored in rate magnitude memory 46 is periodically transferred to count memory 52. Because count memory 52 uses different codes from rate magnitude memory 46 to represent particular values, the value of count n is transformed upon transfer to count memory 52. That count is decremented by shift clock pulses received once each slot from counter clock gate 54, upon the gating of an end-of-slot signal and a phase slice clock. When the four bits in count memory 52 are thus decremented to a predetermined count, such as 0001, the count memory asserts an end count signal to counter clock gate 54, whereupon the latter asserts a load clock signal to count memory 52, thereby to cause the rate memory value count in rate magnitude memory 46 to again be stored into count memory 52. Once this count is stored in count memory 52, the end count signal is no longer asserted and the count clock gate 54 again produces, at the end of each slot, a shift clock pulse to the count memory, which causes the count memory to again decrement through a prescribed cycle once each slot until the count in count memory 52 again returns to the end count condition of 0001, at which time an end count signal is again asserted and applied to the counter clock gate.

Each time an end count signal is applied to counter clock gate 54, the latter asserts a rate output adjust or adjust next slot signal at a rate dependent on n, the rate memory value. That is, the adjust next slot signal, as noted, is caused to be asserted to the LFA once every (12/n) slots, where n is either 4, 3, 2, or 1; that is, once every 3, 4, 6, or 12 slots. When n=0, the KEQZ signal from the rate limit logic 50 to the counter clock gate inhibits the assertion of a rate adjust signal. Moreover, depending on the rate sign received by the counter clock gate from rate sign memory 48, the adjust next slot signal is either an instruction to the LFA 24 to increase the slot length or to decrease the slot length. Thus, center frequency correction 30 produces an output signal, here the adjust next slot signal, at a rate which is linearly variable with respect to increments (or decrements) in the count or number n stored in rate magnitude memory 46, which, in turn, is incremented (or decremented) by signals received from LFA 24 as applied to rate memory clock gate 44. As will be described, the change in the rate or frequency of the output adjust next slot signal is the same for each increment (or decrement) in the count n. Thus, as in the embodiment shown, as n varies from 1 to 2, 3, and 4, the rate of the output pulses produced by center frequency correction 30 is $\frac{1}{3}$, $\frac{1}{4}$, 1/6 and 1/12 the input frequency (of the end of slot signal), respectively.

Having thus described the operation of the data separator system of FIG. 5, a more detailed description of the various portions of the system shown in block form in FIG. 5 is now provided with reference to FIGS. 9-15.

Referring first to FIG. 9, there is shown a block diagram of the differentiator/synchronizer 20, which produces an output raw detect signal that is synchronous to a phase clock, and corresponds to a particular edge of an input disk data signal, which may be asynchronous to the phase slice clock. The raw detect signal is asserted for each selected edge of the input signal and lasts for one and only one phase clock.

As shown in FIG. 9, the rising edge of the input disk data signal is applied to a flip-flop 56, which is caused to toggle. The output of flip-flop 56 is applied to the input of a three-stage shift register 58 clocked by the phase slice clocks. As the signal propagates through the shift register, a memory cycle occurs such that all but the last stage of the shift register have toggled. During this cycle an exclusive NOR gate 60 detects the difference between the last and next-to-last shift register stages, and produces a false output to an output flip-flop 62, the output of which is the inverse raw detect signal, applied to the input of detect memory 22, which is shown in greater detail in FIG. 9.

As therein shown, the inverse raw detect signal from differentiator/synchronizer 20 is applied to a NOR gate 64, which receives its other input from the output of a flip-flop 66. Flip-flop 66 in turn receives at its input the output of a NOR gate 68, which receives at its inputs the end-of-slot signal and the inverse detect remembered signal from the output of a NOR gate 70. The latter receives at its inputs the outputs of flip-flop 66 and NOR gate 64. The end-of-slot signal, when present, clears the flip-flop memory 66 of any previously recognized disk data signal. As noted previously, the detect signal is applied to LFA 24, whereas the inverse detect remembered signal is applied to output waveform regenerator 28, which is shown in greater detail in FIG. 10.

As therein shown, the end-of-slot signal is applied to the input of a three-stage shift register 72, which is clocked by the phase clocks. The output of shift register 72, which is delayed from the input end-of-slot signal by three phase slices, is applied to an exclusive OR gate 74, the output of which is applied to a one-bit flip-flop memory 76. The output of the latter is connected in feedback in both its true and inverted forms to the inputs of the exclusive OR gate 74. The inverted output of flip-flop 76 is applied to the input of an output buffer-inverter 78, the output of which is the delayed separated clock shown in FIG. 4(d).

Output waveform regenerator 28 also receives as an input the inverse detect remembered signal from detect memory 22 at one input of a NOR gate 79. The other input of gate 78 is an inverted end-of-cycle signal, and the output of gate 78 is applied to a one-bit flip-flop memory 80, which delays the gated end-of-slot by one slice clock and applies its output signal to a second output buffer-inverter 82. The output of inverter 82 is the inverse separated data signal shown in FIG. 4(e).

Figure 11:
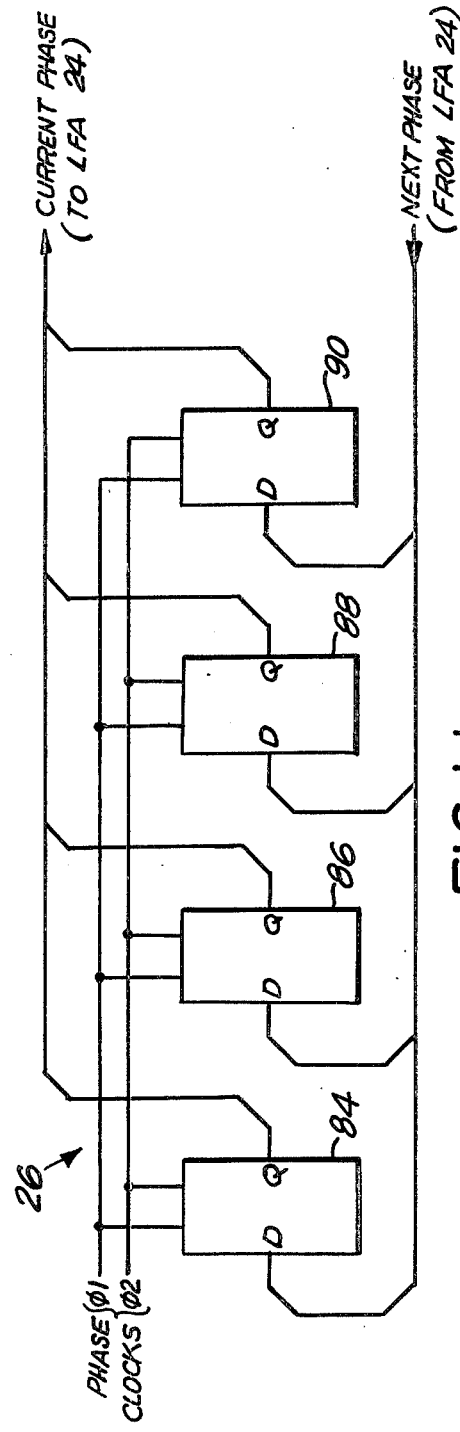
FIG. 11 is a schematic diagram of the phase memory of the data separator of FIG. 5.

The phase memory 26, as shown in FIG. 11, consists of a four-bit register including flip-flops 84, 86, 88, and 90, each of which receives one bit of the next phase signal from LFA 24, and also receives the phase clocks. The clocked four-bit phase signal as developed in the register is applied as the current phase signal to LFA 24, as described above.

Figure 12:
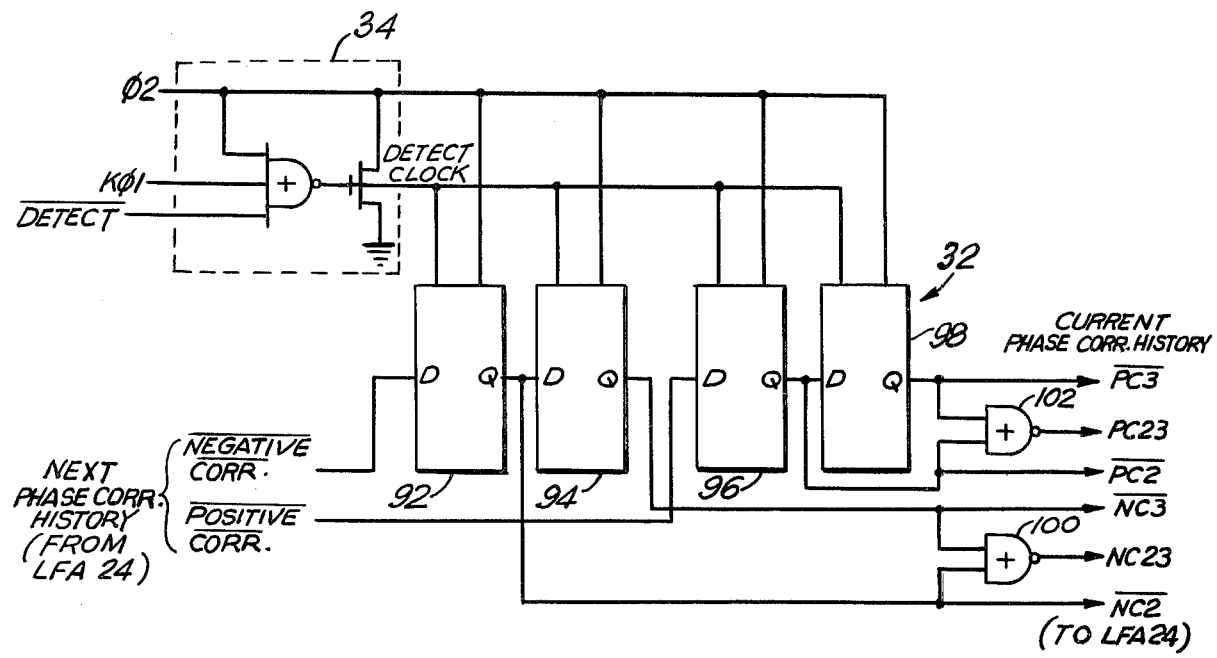
FIG. 12 is a schematic diagram of the phase correction memory and detect clock gate of the data separator of FIG. 5.

The phase correction memory 32, as shown in detail in FIG. 12, includes a first two-bit shift register consisting of flip-flops 92 and 94, and a second two-bit shift register consisting of flip-flops 96 and 98. The two shift registers also receive the detect clock signal from the detect clock gate 34, which is also shown in FIG. 12. The first shift register of phase correction memory 32 receives an inverse negative correction signal, when asserted by LFA 24, and remembers or stores the negative correction values associated with the previous two disk data detects. In a similar manner, the second shift register remembers or stores the positive correction values associated with the previous two disk data detects. The outputs of flip-flops 92 and 94 are applied to the inputs of a NOR gate 100, and along with the output of NOR gate 100 to LFA 24. Similarly, the outputs of flip-flops 96 and 98 are applied to the inputs of a NOR gate 102, and along with the output of gate 102 are applied to LFA 24. The outputs of gates 100 and 102 and of flip-flops 92–98 constitute the current phase correction information supplied by phase correction memory 32 to LFA 24, as described above.

Figure 13:
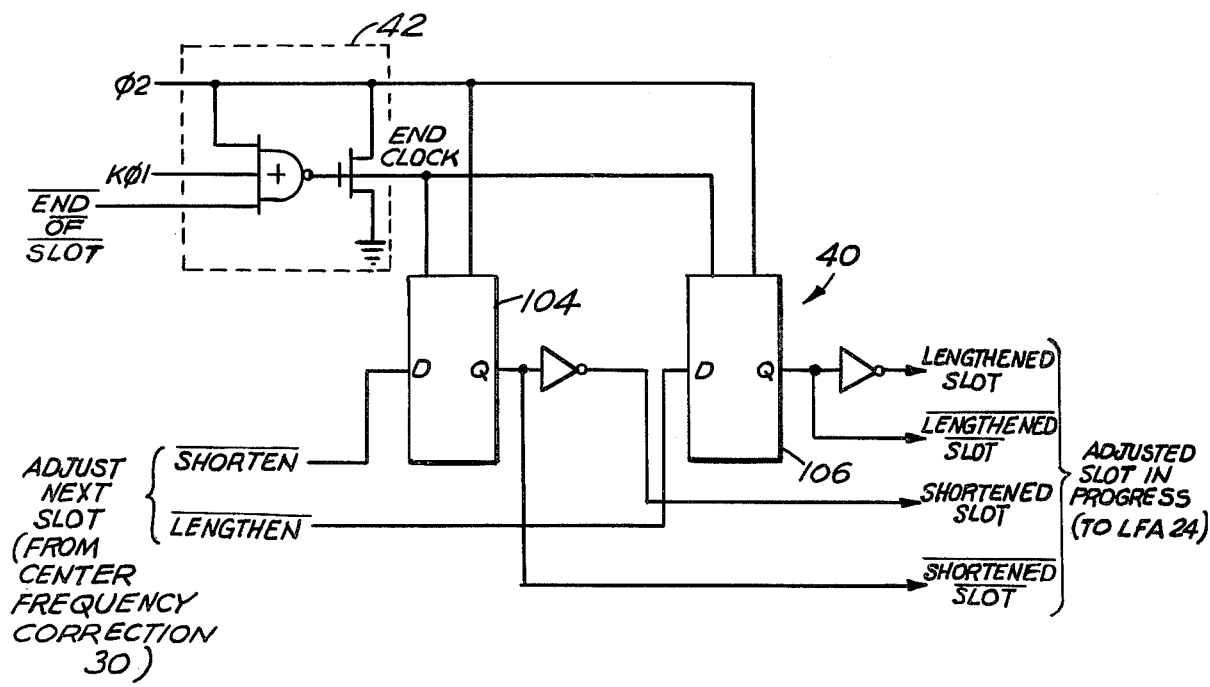
FIG. 13 is a schematic diagram of the adjusted slot memory and end clock gate of the data separator of FIG. 5.

The adjusted slot memory 40, as illustrated in FIG. 13, receives the end clock from end clock gate 42, which is also shown in FIG. 13, and the inverse adjust next slot (shorten or lengthen slot) from the center frequency correction 30. The inverse slot shorten and slot lengthen signals, when asserted, are respectively applied to one-bit flip-flop memories 104 and 106, which also receive the end clock. The true and inverted outputs of flip-flops 104 and 106 (i.e., lengthened slot and shortened slot) are applied as the adjust slot in progress signal to LFA 24.

The input and output NOR gates of LFA 24, which implement the phase adjust algorithm as described above, are shown in schematic form in FIG. 14 along with all the inputs to and outputs of the LFA. The resistors numbered 1–32 shown at the upper portion of FIG. 14 represent load devices of the input NOR gates, and the resistors shown at the lower left-hand portion of FIG. 14 represent load devices of the output NOR gates of the LFA. The upper and lower, or input and output, portions of the LFA are separated by a broken line.

In the upper or input portion of LFA 24 each circle appearing at an intersection of a vertical and a horizontal line represents an input of the NOR gate indicated schematically by the resistor at the upper part of that vertical line. Thus, for example, the input NOR gate represented by the resistor 1 receives at its inputs the inverted bit 0, inverted bit 1, inverted bit 2, and inverted bit 3 current phase signals, which are applied to LFA 24 from phase memory 26. Similarly, the input NOR gate identified by resistor 26 receives at its inputs the inverted detect signal, the inverted bit 3 and inverted bit 0 current phase signals, the bit 2 and bit 1 current phase signals, and the inverted shortened slot signal.

The outputs of all of the 32 input NOR gates are applied as the inputs to the ten output NOR gates which are represented schematically at the lower portion of FIG. 14. The inputs to the output NOR gates represented by the ten horizontal lines of the lower portion of FIG. 14 are also represented by circles drawn at the intersections of the vertical and lower horizontal lines. Thus, for example, the NOR gate represented by the second resistor from the top of the output NOR gates and which produces the bit 3 next phase signal, receives as inputs the outputs of the input NOR gates represented schematically by the resistors numbered 1, 6–9, 11, 19, 20, and 22–31.

As shown in FIG. 15, the rate memory clock gate 44 of center frequency correction 30, receives the inverse of the increment or decrement frequency signal along with an inverse of a change frequency signal, which is asserted when either an increment or decrement frequency signal is asserted. The rate memory clock gate also receives the rate sign signals KSIGN (count less than or equal to zero) and $\overline{\text{KSIGN}}$ (count greater than or equal to zero) from the rate sign memory 48, along with the KEQZ (count equal to zero) signal from rate limit logic 50. The rate sign signals are applied through a series of switching FETs 108 to the inputs of NOR gates 110 and 112, which along with a NOR gate 114 also receive the phase clocks. NOR gates 110, 112, and 114 also receive the true or inverse of the count out of range signal from rate limit logic 50, and NOR gate 110 also receives the KMAX (count maximum) signal from rate limit logic 50.

The signals produced by the rate memory clock gate, namely, the right clock (up), left clock (down), or zero clock (or clear) signals are applied to rate magnitude memory 46, which includes a three-stage left-shift/right-shift up/down counter made up of identical stages 116, 118, and 120, the circuit configuration of which is shown in stage 116. The inverse output of stage 116 is applied to stage 120, and the inverse output of stage 120 is applied back to the input of stage 116. Rate magnitude memory 46 is thus in the form of a three-stage left-shift/right-shift Johnson up/down counter made up of the three register stages 116–120 and the inverters 122 and 124. The output of the three stages of the Johnson counter of rate magnitude memory 46 are respectively applied to the inputs of the first three stages 144, 146, and 148 of count memory 52, which, as noted, is a four-stage presettable "random-walk" counter. The input to the fourth stage 150 of count memory 52 is connected to Vdd and is thus maintained at a logic "1" at all times. The circuit configuration of the four stages 144–150 of memory 52 is illustrated only for stage 144, it being understood that the other stages are all of the same circuit configuration.

The outputs of stages 148 and 150 are applied to the inputs of an exclusive OR gate 152 the output of which is applied to the input of the first stage 144. The outputs of the first three stages 144–148 are applied to the input of a NOR gate 154, the output of which is the end count signal, which is produced whenever the bit counts in stages 144, 146, and 148 are all at the "0" logic level; the end count signal is applied back to the counter clock gate 54.

As stated previously, the end count signal is asserted at a rate which is linearly variable with increments in the count n stored in the rate magnitude memory 46. That is, for the count n stored in rate magnitude memory 46 of 1, 2, 3, and 4, count memory 52 acts as a rate divider at factors of 12, 6, 4, and 3, respectively. Stated differently, if the rate or frequency of an input signal, such as the end of slot signal, is FX, the rate of the output of count memory 52, which is the end count signal, is respectively 1/12 FX, 2/12 FX, 3/12 FX and 4/12 FX for values of n of 1, 2, 3, and 4. It will be readily observed that these output frequencies differ from one another by the equal factor of 1/12 FX.

This linearly incrementable rate generation is achieved in center frequency correction 30, as illustrated in FIGS. 5 and 15, in the following manner.

The count memory 52, which produces the end count signal, is, as noted and as illustrated in FIG. 15, a four-stage random-walk counter which includes a four-bit presettable shift register composed of stages or bits 144–150, in which binary signals BIT1, BIT2, BIT3, and BIT4 are respectively stored. Depending upon the state of the end count signal, an input clock (at the frequency of the end of slot signal from LFA 24) to the gating circuits of count memory 52 will produce either a shift clock or a preset clock to the shift register. If the end count signal is low (not asserted), an input clock will produce a shift clock, causing each bit except the first to take the state of the previous bit and causing BIT1 to take the state of the exclusive-OR of BIT3 and BIT4. If the end count signal is high (asserted), an input clock will produce a preset clock, causing each bit to take the state of its preset input.

As noted previously, the end count signal is asserted when BIT1, BIT2, and BIT3 are all zero (low). Depending upon the states of the preset signals to the four bits of count memory 52, from 1 to 15 input clocks will be required for each preset clock produced. If the preset inputs (PR1-PR4) to the four bits of count memory 52 are all zero (low), then the end count signal will be continuously high and every input clock will produce a preset clock.

The following table shows the counting sequence of the divider implemented by count memory 52 for the states BIT1 through BIT4. Since it is desired that the count memory divide by 12, 6, 4 or 3 for rate memory values of n equal to 1, 2, 3 or 4, respectively, these preset values are marked in the margin for the corresponding rate memory values of n=1, 2, 3, or 4.

| Cycle Length | BIT 1 | BIT 2 | BIT 3 | BIT 4 | |
|---|---|---|---|---|---|
| 15 | 1 | 0 | 0 | 0 | |
| 14 | 0 | 1 | 0 | 0 | |
| 13 | 0 | 0 | 1 | 0 | |
| 12 | 1 | 0 | 0 | 1 | n = 1 |
| 11 | 1 | 1 | 0 | 0 | |
| 10 | 0 | 1 | 1 | 0 | |
| 9 | 1 | 0 | 1 | 1 | |
| 8 | 0 | 1 | 0 | 1 | |
| 7 | 1 | 0 | 1 | 0 | |
| 6 | 1 | 1 | 0 | 1 | n = 2 |
| 5 | 1 | 1 | 1 | 0 | |
| 4 | 1 | 1 | 1 | 1 | n = 3 |
| 3 | 0 | 1 | 1 | 1 | n = 4 |
| 2 | 0 | 0 | 1 | 1 | |
| 1 | 0 | 0 | 0 | X | (end count is asserted) |

The preset inputs PR1-PR4 to the count memory necessary to achieve the desired linearly incrementable division for values of n of 1, 2, 3 and 4 corresponding to a desired divider factor n' of 12, 6, 4 and 3 of the count memory 52, respectively, are shown in the following table.

| n | n' | PR 1 | PR 2 | PR 3 | PR 4 |
|---|---|---|---|---|---|
| 1 | 12 | 1 | 0 | 0 | 1 |
| 2 | 6 | 1 | 1 | 0 | 1 |
| 3 | 4 | 1 | 1 | 1 | 1 |
| 4 | 3 | 0 | 1 | 1 | 1 |

Since, as seen in the foregoing table, the desired state of PR4 is always high, the preset input of bit 150, which produces this logic state, is permanently connected to a source of logic-1 value, such as the circuit power supply Vdd. It then remains to supply appropriate values for signals PR1, PR2, and PR3 to effect the desired divisor.

In the circuits of FIGS. 5 and 15, these preset signals to the count memory are derived from the Johnson counter of rate magnitude memory 46. Clock gate 44 may apply any of a number of clocks to rate magnitude memory 46, two of which are right clock (up, $\phi R$) and left clock (down, $\phi L$). For clarity, the first, second, and third stages, 116, 118, and 120, of rate magnitude memory Johnson counter 46 will be referred to as JCB1, JCB2, and JCB3, respectively. The application of right clocks to this counter from NOR gate 110 of clock gate 44 results in stages 118 and 120 of the counter (JCB2 and JCB3) taking the states of stages 116 and 118 (JCB1 and JCB2), respectively, and in stage 116 (JCB1) taking the inverse state of stage 120 (JCB3). The application of left clocks to this counter from NOR gate 112 of clock gate 44 reverses this operation and results in stages 116 and 118 (JCB1 and JCB2) taking the inverse state of stage 116 (JCB1). The following table shows the Johnson counter counting sequence. The application of right (up) clocks will cause n to increment from zero up to five, and the application of left (down) clocks will cause n to decrement from five down to zero. Provided that the Johnson counter is preset to one of the six states shown, the application of clocks will cause the value of the counter to repeat with a cycle length of 6.

| N | JCB 1 | JCB 2 | JCB 3 | |
|---|---|---|---|---|
| 0 | 0 | 0 | 0 | minimum allowed value |
| 1 | 1 | 0 | 0 | |
| 2 | 1 | 1 | 0 | |
| 3 | 1 | 1 | 1 | |
| 4 | 0 | 1 | 1 | maximum allowed value |
| 5 | 0 | 0 | 1 | not used |

It will be noted that the states of the Johnson counter JCB1, JCB2, and JCB3 are identical to the states of PR1, PR2, and PR3, respectively required to achieve the incrementally linear division factors for counts n of 1, 2, 3 and 4. The outputs of the three stages 116, 118, and 120 of rate magnitude memory 46, JCB1, JCB2, and JCB3, respectively, become the signals PR1, PR2, and PR3, respectively, applied to the preset inputs of the programmable divider of count memory 52 along with the constant logic-1 applied to the preset input BIT4. In this manner, the count memory 52 will produce the divider factor n' of 12, 6, 4 and 3 in response to counts n of 1, 2, 3 and 4 in rate magnitude memory 46 as desired for linearly incrementable operation.

The incrementable digital rate generator, as shown, may also include a rate limit logic 50 to perform any of three functions. First, the rate limit logic 50 may detect the condition in which the Johnson counter bits JCB1, JCB2, and JCB3 are all equal to zero (n=0), and upon this detection apply a signal to counter clock gate 54 to suppress the adjust next slot signal from gate 54, when n equals 0. Second, the rate limit logic 50 may detect the condition of the Johnson counter having a value other than those used in normal operation (such as may occur when power is first applied). This detection may be applied to the rate memory clock gate 44 to cause the Johnson counter to reset to an allowed value. Third, the rate limit logic 50 may detect the condition of the Johnson counter being at its maximum value (n=4). These detections may be applied to the rate memory clock gate 44 to suppress incrementing the Johnson counter when it is at its maximum value or to suppress decrementing it when it is at its minimum value.

The first bit of the count stored in stage 116 of rate magnitude memory 46 is applied to the inputs of NOR gates 125, 126, and 128 of rate limit logic 50. The second bit of the count is stage 118 of rate magnitude memory 46 is applied to the inputs of NOR gates 130 and 128, and the inverse second bit is applied to the inputs of NOR gates 126 and 125. The third bit of rate memory count stored in stage 120 of rate magnitude memory 46 is applied to the inputs of NOR gates 125 and 128, and in inverted form to the inputs of NOR gates 130 and 126. The outputs of gates 130 and 125 are applied to the inputs of a NOR gate 134, the output of which is the inverse of the count out of range signal; the output of NOR gate 126 is the KMAX signal; and the output of NOR gate 128 is the KEQZ signal. These signals, as described prevously, are applied to the rate memory clock gate 44.

The KEQZ signal from gate 128 is also applied to the inputs of NOR gates 136 and 138 included within rate memory clock gate 44, which NOR gates also respectively receive the KSIGN and $\overline{\text{KSIGN}}$ signals from a one-stage flip-flop 140 included within rate sign memory 48. The latter receives the inverse decrease frequency signal from LFA 24 and the right clock (up) signal from the output of gate 110 included within rate memory clock gate 44. The outputs of NOR gates 136 and 138 are the KGTZ (count greater than zero) and KLTZ (count less than zero) signals, respectively, and are applied to the control inputs of switching FETs 108 along with the KEQZ signal.

STages 144-150 of count memory 52 also receive the gated phase slice clocks including shift clock and load clock signals from the counter clock gate 54, which includes a group of NOR gates 156, 158, 160, and 162, the first two of which receive the phase clocks. Gate 156 also receives the inverse end-of-slot signal from LFA 24 and the end count signal from count memory 52, and produces at its output the shift clock signal to the count memory. Gate 158 also receives the inverse end-of-slot signal as well as the KEQZ signal and end count signal as inverted in an inverter 164 and produces at its output the load clock signal to the count memory. Gate 160 receives the inverted end count signal as well as the KEQZ signal and the output KSIGN signal of flip-flop 140 as inverted by inverter 142 from rate sign memory 48. Gate 162 receives the inverted end count signal, the KEQZ signal, and the $\overline{\text{KSIGN}}$ signal from the true output of flip-flop 140.

The output of NOR gate 156 is the shift clock signal, which, when applied to count memory 52, causes the stages of the count memory to shift by one count. The output of gate 158 is the load clock signal, which, when present, causes the three bits from rate magnitude memory 46 together with a constant logic "1" to be loaded into the count memory. The output of NOR gates 160 and 162 are respectively the shorten and lengthen next slot signals, which are respectively inverted in inverters 166 and 168. The trues and inverses of these adjust next slot signals are applied to the LFA 24 and to the adjusted slot memory 40 as described previously.

It will be appreciated from the foregoing description of a presently preferred embodiment of the present invention that derived data and clock signals are provided for use by a controller in a manner that ensures the desired nonambiguous phase relationship between the data and the associated clock signals. The data separator of the invention further includes means for monitoring recent phase correction made to the derived clock and for making corresponding modifications to the slot length and thus to the effective frequency of the synthetic oscillator portion of the data separator.

It will be understood that the invention has been hereinabove described with reference to a single embodiment thereof. It is, however, to be further understood that modifications to the disclosed embodiment may be made without necessarily departing from the spirit and scope of the invention.

What is claimed is:

1. A data separator for deriving clock signals from an input data source, said data separator comprising means for detecting an input data signal and for producing a detect signal, means operatively connected to said detecting means for deriving a clock signal which defines a clock slot whose phase and frequency match the average phase and frequency of said input data signal, said clock signal deriving means comprising counting means for dividing the frequency of a fixed-frequency reference signal such that each reference signal cycle defines one phase slice, a predetermined integral number n of said phase slices defining each of said clock slots, and logic means responsive to said detecting means and operatively connected to said counting means for adjusting the modulus of said counting means, said logic means being responsive to the value of the count stored in said counting means, whereby the adjustment of the modulus of said counting means consists of the insertion or deletion of an integral number less than n of said phase slices from a clock slot, said integral number less than n being determined in accordance with the degree to which the detect signal produced by said detecting means varies in relative position from the center of the clock slot signal produced by said counting means, said logic means thereby being effective to adjust the phase of said derived clock signal within a time interval less than that of one clock slot, such that the signal produced by said detecting means is more nearly centered with respect to the associated derived clock.

2. The data separator of claim 1, in which said logic means includes a synthetic oscillator for producing at a predetermined rate an end-of-slot signal which defines the duration of a derived clock slot.

3. The data separator of claim 2, further comprising means for sensing a predetermined count of adjustments to the phase of the derived clock signal made previously by said logic means, and means responsive to the sensed count of prior phase adjustments for modifying the effective clock slot frequency of said synthetic oscillator.

4. The data separator of claim 3, in which said phase adjustment sensing means includes means responsive to both the number and magnitude of the prior phase adjustments.

5. The data separator of claim 4, in which said phase adjusting means comprises means for distinguishing between a relatively moderate positive or negative phase adjustment and a relatively severe positive or negative phase adjustment, and for causing a modification of the frequency of said synthetic oscillator upon the occurrence of a first predetermined number of severe phase adjust-means or upon the occurrence of a second larger predetermined number of moderate phase adjustments.

6. The data separator of claim 2, in which said logic means includes a logic function array for implementing a predetermined phase adjustment algorithm.

7. The data separator of claim 6, further comprising means for detecting a data input once every clock slot, and an output waveform regenerator operatively connected to said logic function array and to said data detecting means for producing the derived clock at a predetermined phase relation to the end-of-slot signal.

8. The data separator of claim 6, in which said synthetic oscillator further includes a phase memory for storing current phase information and for providing said phase information to said logic function array once every phase slice clock cycle.

9. The data separator of claim 6 further comprising means for sensing a predetermined count of prior phase adjustments made by said phase adjusting means, and means responsive to the sensed count of prior phase adjustments for modifying the effective clock slot frequency of said synthetic oscillator.

10. The data separator of claim 9, in which said means for sensing the count of prior phase adjustments includes means responsive to both the number and magnitude of the prior phase adjustments.

11. The data separator of claim 10, in which said logic means comprises means for distinguishing between a relatively moderate positive or negative phase adjustment and a relatively severe positive or negative phase adjustment, and for causing a modification of the frequency of said synthetic oscillator upon the occurrence of a first predetermined number of severe phase adjust means or upon the occurrence of a second larger predetermined number of moderate phase adjustments.

12. The data separator of claim 9, in which said frequency modifying means includes means for storing a rate memory value corresponding to the sensed phase adjustments, and means for making an adjustment to the synthetic oscillator frequency at a rate bearing a predetermined relationship to the stored rate memory value.

13. The data separator of claim 12, in which said frequency modifying means includes a first memory for storing said rate memory value, a second memory, means for periodically loading said second memory with said rate memory value from said first memory, means for thereafter periodically modifying the count in said second memory until the occurrence of a predetermined end count value, said second memory thereupon producing an end count signal, a means effective upon the occurrence of said end count signal to provide an adjust next slot signal to said synthetic oscillator.

14. The data separator of claim 13, further comprising an adjusted slot memory operatively connected to said logic function array and to said frequency modifying means for providing a signal to said logic function array indicating that an adjusted slot is in progress.

15. The data separator of claim 13, further comprising a phase correction memory operatively connected to said logic function array for providing a signal to said logic function array indicating current phase correction history information.

16. A linearly incrementable rate generator for producing an output signal at a rate that varies in equal increments as a function of a count n, said rate generator comprising a multi-bit rate magnitude memory Johnson counter for storing the count n, a presettable multi-bit random-walk counter having a plurality of stages respectively coupled to the stages of said rate magnitude memory counter, and a clock gate coupled to said random-walk counter and receiving an input signal and providing shift pulses to said random-walk counter, said random-walk counter being capable of producing an output signal at a rate equal to that of the input signal divided by a series of divider factors n' to provide a linearly incremental division of the rate of the input signal, the logic level in the stages of said random-walk counter established in correspondence to the count n then stored in said rate magnitude memory counter forming a logic pattern for a value of n'.

17. The incremental rate generator of claim 16, further comprising a rate limit logic coupled to the bits of said rate magnitude memory Johnson counter and to said counter clock gate to inhibit the production of any output signal when the count stored in said rate magnitude memory Johnson counter is zero.

18. The incremental rate generator of claim 17, further comprising a rate memory clock gate coupled to and providing up or down shift pulses to said rate magnitude memory Johnson counter, said rate limit logic also being coupled to said rate memory clock gate and being effective when the count in said rate magnitude memory is other than an allowed value to cause said rate memory clock gate to reset said rate magnitude memory Johnson counter to an allowed value, or effective when said rate magnitude memory is at its maximum or minimum value to respectively suppress incrementing or decrementing said rate magnitude memory Johnson counter.

* * * * *